(12) United States Patent
Saito et al.

(10) Patent No.: US 10,717,158 B2
(45) Date of Patent: Jul. 21, 2020

(54) SOLDER ALLOY FOR PREVENTING FE EROSION, RESIN FLUX CORED SOLDER, WIRE SOLDER, RESIN FLUX CORED WIRE SOLDER, FLUX COATED SOLDER, SOLDER JOINT AND SOLDERING METHOD

(71) Applicant: SENJU METAL INDUSTRY CO., LTD., Tokyo (JP)

(72) Inventors: Takashi Saito, Tokyo (JP); Shunsaku Yoshikawa, Tokyo (JP); Yoko Kurasawa, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/066,956

(22) PCT Filed: Aug. 17, 2017

(86) PCT No.: PCT/JP2017/029530
§ 371 (c)(1),
(2) Date: Jun. 28, 2018

(87) PCT Pub. No.: WO2018/034320
PCT Pub. Date: Feb. 22, 2018

(65) Prior Publication Data
US 2019/0001443 A1    Jan. 3, 2019

(30) Foreign Application Priority Data

Aug. 19, 2016 (JP) .................................. 2016-161575
Dec. 21, 2016 (JP) .................................. 2016-248419

(51) Int. Cl.
| | |
|---|---|
| *B23K 35/26* | (2006.01) |
| *C22C 13/00* | (2006.01) |
| *C22C 13/02* | (2006.01) |
| *B23K 35/02* | (2006.01) |
| *B23K 35/36* | (2006.01) |
| *B23K 1/19* | (2006.01) |

(52) U.S. Cl.
CPC .............. *B23K 35/262* (2013.01); *B23K 1/19* (2013.01); *B23K 35/0227* (2013.01); *B23K 35/0261* (2013.01); *B23K 35/3613* (2013.01); *C22C 13/00* (2013.01); *C22C 13/02* (2013.01)

(58) Field of Classification Search
CPC ... B23K 35/26; B23K 35/262; B23K 35/0227

USPC .......................................................... 148/24
See application file for complete search history.

(56) References Cited

U.S. PATENT DOCUMENTS

| | | |
|---|---|---|
| 2004/0141873 A1 | 7/2004 | Takemoto et al. |
| 2008/0159903 A1 | 7/2008 | Lewis et al. |
| 2008/0159904 A1 | 7/2008 | Lewis et al. |
| 2008/0292492 A1 | 11/2008 | Ingham et al. |
| 2015/0217410 A1 | 8/2015 | Fujimaki et al. |
| 2016/0107267 A1 | 4/2016 | Ingham et al. |
| 2016/0271737 A1* | 9/2016 | Ikeda ................. B23K 35/3618 |

FOREIGN PATENT DOCUMENTS

| | | |
|---|---|---|
| CN | 102161135 A | 8/2011 |
| CN | 102513720 B | 5/2014 |
| CN | 105234580 A | 1/2016 |
| EP | 2883649 A | 6/2015 |
| JP | 2005-153007 A | 6/2005 |
| JP | 2008-521619 A | 6/2008 |
| JP | 2009-506203 A | 2/2009 |
| JP | 4577888 B | 11/2010 |
| JP | 2012-218002 A | 11/2012 |
| WO | WO-2007023288 A2 * | 3/2007 ........... B23K 35/262 |

OTHER PUBLICATIONS

Extended European Search Report dated Oct. 4, 2018 for the corresponding European Patent Application No. 17841542.8.
Office Action dated Nov. 12, 2018 for the corresponding Chinese Patent Application No. 201780004316.X.
International Search Report dated Nov. 21, 2017 for the corresponding PCT Application No. PCT/JP2017/029530.
Written Opinion dated Nov. 12, 2017 for the corresponding PCT Application No. PCT/JP2017/029530.

* cited by examiner

*Primary Examiner* — Weiping Zhu
(74) *Attorney, Agent, or Firm* — Leason Ellis LLP

(57) ABSTRACT

Provided are a solder alloy for preventing Fe erosion, a resin flux cored solder, a wire solder, a resin flux cored wire solder, a flux coated solder, a solder joint, and a soldering method which, in order to prolong the life of a soldering iron tip, suppress erosion of the soldering iron tip and by which adhesion of carbide to the soldering iron tip is suppressed. The present invention has an alloy composition comprising, by mass %, 0.02-0.1% Fe, more than 0% and equal to or less than 0.2% Zr, with the remainder being Sn, and is used to prevent Fe erosion.

10 Claims, 1 Drawing Sheet

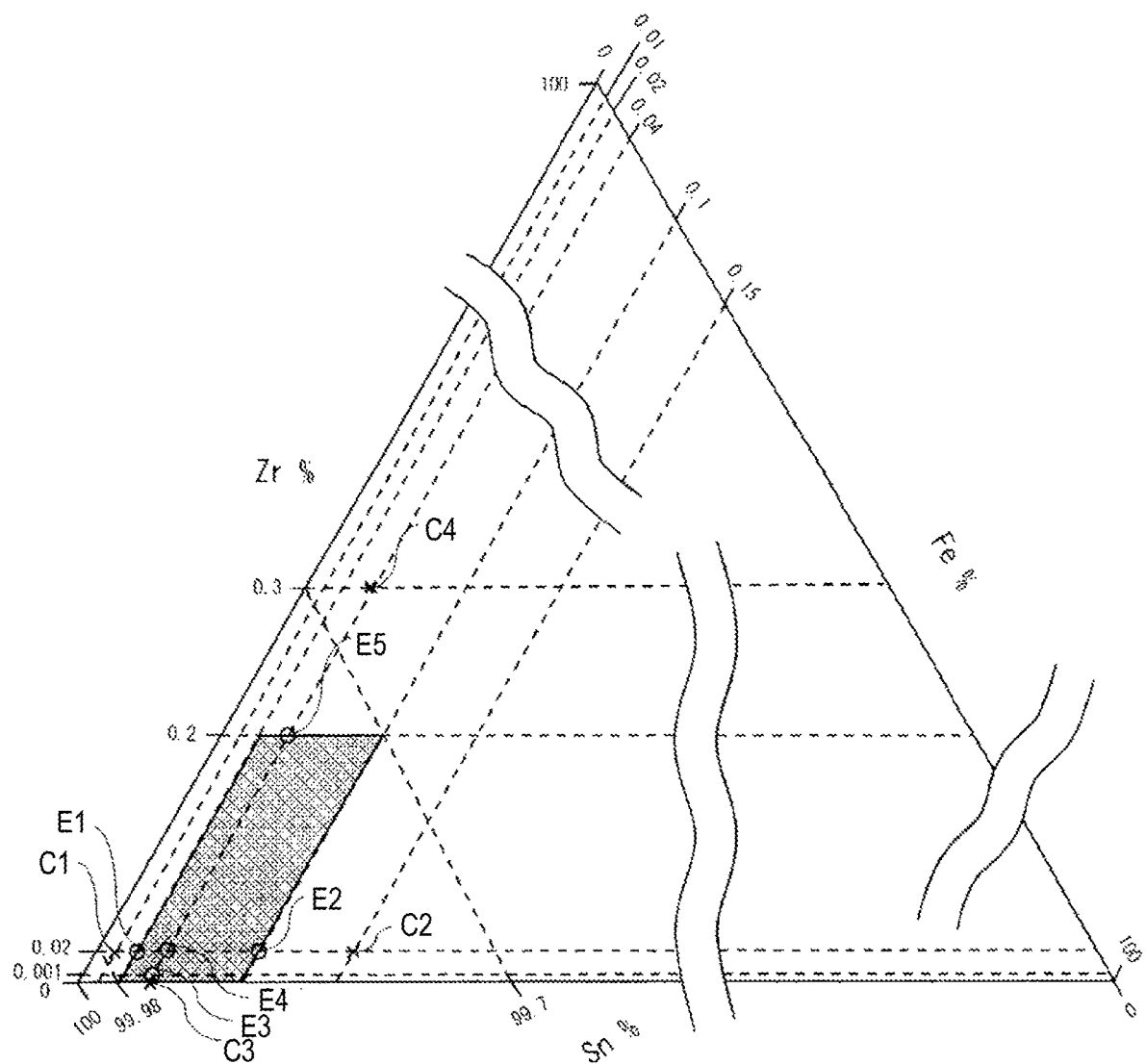
E1: Example 1  C1: Comparative Example 1
E2: Example 2  C2: Comparative Example 2
E3: Example 3  C3: Comparative Example 3
E4: Example 4  C4: Comparative Example 4
E5: Example 5

SOLDER ALLOY FOR PREVENTING FE EROSION, RESIN FLUX CORED SOLDER, WIRE SOLDER, RESIN FLUX CORED WIRE SOLDER, FLUX COATED SOLDER, SOLDER JOINT AND SOLDERING METHOD

CROSS-REFERENCE TO RELATED PATENT APPLICATIONS

This application is a U.S. National Phase Application under 35 U.S.C. § 371 of International Patent Application No. PCT/JP2017/029530 filed on Aug. 17, 2017 and claims the benefit of Japanese Patent Applications No. 2016-161575, filed on Aug. 19, 2016, and No. 2016-248419, filed on Dec. 21, 2016, all of which are incorporated herein by reference in their entireties. The International Application was published in Japanese on Feb. 22, 2018 as International Publication No. WO/2018/034320 under PCT Article 21(2).

FIELD OF THE INVENTION

The present invention relates to a solder alloy for preventing Fe leaching which can prevent iron-tip leaching and carbonization of a flux, a flux-cored solder, a wire solder, a flux-cored wire solder, a flux-coated solder, a solder joint and a soldering method.

BACKGROUND OF THE INVENTION

Lead-free Sn—Ag—Cu-based solder alloys are mainly used for connection of electric terminals of printed boards or the like. The lead-free Sn—Ag—Cu-based solder alloys are used in various techniques such as flow soldering, reflow soldering and soldering using soldering irons.

Examples of the soldering using soldering irons include soldering by manual operation such as manual soldering. In recent years, the soldering using soldering irons is increasingly automated, and the soldering is automatically performed by iron robots.

The soldering iron is composed of a heating element and an iron tip, and the iron tip is heated by conducting heat of the heating element to the iron tip. In order to efficiently conduct the heat of the heating element to the iron tip, Cu having good thermal conductivity is used for a core material of the iron tip. However, when a solder comes into direct contact with Cu, Cu is leached by Sn in the solder alloy, and a shape of the iron tip is deformed, which makes it difficult to use as the soldering iron. In order to prevent iron-tip leaching caused by Sn, the iron tip is coated with Fe and Fe alloy plating.

As described above, from the viewpoint of prolonging the lifetime of the iron tip, the iron tip is coated with the Fe and Fe alloy plating. However, with an increase in the number of times of soldering due to the automation of the soldering, the leaching has come to occur in the coating on an iron tip surface. The reason why the Fe and Fe alloy plating is leached is that Fe is alloyed with Sn in the solder alloy by mutual diffusion to lead to easy dissolution in Sn in a molten solder. Accordingly, measures on the soldering iron side have limitations, and solder alloys which prevents the occurrence of the Fe leaching have been studied.

Patent Document 1 proposes an alloy in which Co is added to a Sn—Ag—Cu-based solder alloy. According to this document, when Co is added to the Sn—Ag—Cu-based solder alloy, diffusion of Fe into the solder alloy is prevented and an effect of being able to prevent the Fe leaching is obtained.

In addition, as Sn—Ag—Cu—Co-based solder alloys, Patent Documents 2 and 3 propose solder alloys for the purpose of preventing formation of intermetallic compounds or generation of voids, assuming that the solder alloys are used in the reflow soldering.

PRIOR ART DOCUMENTS

Patent Documents

Patent Document 1: Japanese Patent No. 4577888
Patent Document 2: JP-A-2008-521619
Patent Document 3: JP-A-2009-506203

Technical Problems

As described above, all of the solder alloys described in Patent Documents 1 to 3 which contain Co prevent diffusion of Fe into the solder alloys. This makes it possible to prolong the lifetime of the iron tip.

However, as the lifetime of the iron tip is prolonged, it has been found that a new problem is encountered. Co prevents the Fe leaching, but has a property of easily reacting with carbon. Accordingly, when soldering is performed thousands of times, the problem of carbide adhesion to the iron tip has come to the surface.

In soldering using a soldering iron, a flux containing rosin as a base material is usually used in order to break an oxide film on a surface of an electric terminal to make it easily wettable with a solder. During the soldering, the rosin is also heated together with the solder. At this time, Co in the solder alloy reacts with carbon and oxygen of the rosin to form a large amount of carbides, which adhere to the iron tip. The carbides adhere to the iron tip by a chemical reaction with Co, and therefore, the carbides are hard to be removed from the iron tip even by air cleaning. Therefore, with an increase in use frequency, the adhesion area of the carbides increases, and finally, the soldering becomes difficult.

In addition, the solder alloys described in Patent Documents 2 and 3 are solder alloys used in reflow soldering, and therefore, the use of the soldering iron is not supposed. Even if the Fe leaching can be prevented because Co happens to be contained, the adhesion of the carbides cannot be prevented as with Patent Document 1. Here, use in a wire form is also disclosed in Patent Document 3. However, the solder alloy is spheroidized by punching in Examples, and therefore, the solder alloy described in Patent Document 3 is premised to be used in the reflow soldering. Accordingly, in the invention described in Patent Document 3, problems caused in the case where soldering is performed by use of the soldering iron are not supposed, and of course, means for solving the problems are not provided.

An object of the present invention is to provide a solder alloy for preventing Fe leaching which prevents iron-tip leaching and adhesion of carbides to an iron tip, for prolonging the lifetime of the iron tip, a flux-cored solder, a wire solder, a flux-cored wire solder, a flux-coated solder, a solder joint and a soldering method.

SUMMARY OF THE INVENTION

Solution to Problems

Initially, the present inventors studied to prevent the adhesion of the carbides to the iron tip by reduction in the Co content. However, although the adhesion of the carbides was prevented, the Fe leaching could not be prevented.

Then, the present inventors went back to a Co-free alloy composition, and first, focused on a Fe-containing solder alloy having a possibility of preventing the Fe leaching and further preventing the adhesion of the carbides as compared with Co. That is, the present inventors studied elements with respect to a Sn—Ag—Cu—Fe solder alloy, which are capable of achieving both the prevention of the Fe leaching and the prevention of the carbonization of the rosin.

Zr is easily oxidized, and is an element hard to handle from the viewpoint of production. Conventionally, therefore, it has not been positively added. On the other hand, it has been known that, when Zr is added to the Sn—Ag—Cu—Fe solder alloy, interface growth of an intermetallic compound at a solder bonding interface is reduced. The Sn—Ag—Cu—Fe solder alloy has an effect of preventing the Fe leaching because of the added Fe. However, Zr which is the element hard to handle was intentionally added in order to further improve the effect of preventing the Fe leaching by reducing diffusion of Sn. As a result, the following findings were obtained: the effect of preventing the Fe leaching was improved, and the carbonization of the rosin was unexpectedly prevented. Furthermore, the following finding was also obtained: even if the rosin was slightly carbonized, the adhesion of the carbides to the iron tip was rarely found.

In addition, Cu is generally used as a material of an electrode. However, Ni or Al may be used depending on the use thereof. An electrode plated with Ni/Au is also used. In order to confirm prolongation of the lifetime of the iron tip and effect of preventing the carbonization without depending on the material of the electrode, Cu-free Sn—Ag—Fe—Zr solder alloys were studied. Furthermore, from the viewpoint of cost reduction, Ag-free Sn—Fe—Zr solder alloys were studied. As a result, in both the solder alloys, the following finding was obtained: an effect similar to that of the Sn—Ag—Cu—Fe solder alloy was obtained.

The present invention achieved based on these findings is as follows.

(1) A solder alloy for preventing Fe leaching, which prevents adhesion of a carbide to an iron tip, the solder alloy having an alloy composition consisting of, in mass %: Fe: 0.02 to 0.1%; and Zr: more than 0% and 0.2% or less, with the balance being Sn.

(2) The solder alloy for preventing Fe leaching according to the above (1), wherein the alloy composition further comprises Cu: 0.1 to 4%.

(3) The solder alloy for preventing Fe leaching according to the above (1) or (2), wherein the alloy composition further comprises at least one of Sb: 5 to 20%, Ag: 4% or less and Bi: 3% or less.

(4) The solder alloy for preventing Fe leaching according to any one of the above (1) to (3), wherein the alloy composition further comprises at least one of Ni: 0.3% or less and Co: 0.2% or less.

(5) The solder alloy for preventing Fe leaching according to any one of the above (1) to (4), wherein the alloy composition further comprises, in mass %, at least one of P: 0.1% or less, Ge: 0.1% or less and Ga: 0.1% or less.

(6) A flux-cored solder comprising the solder alloy for preventing Fe leaching according to any one of the above (1) to (5).

(7) A wire solder comprising the solder alloy for preventing Fe leaching according to any one of the above (1) to (5).

(8) A flux-cored wire solder comprising the solder alloy for preventing Fe leaching according to any one of the above (1) to (5).

(9) A flux-coated solder according to any one of the above (1) to (9), wherein a surface of the solder is coated with a flux.

(10) A solder joint comprising the solder alloy for preventing Fe leaching according to any one of the above (1) to (5).

(11) A soldering method comprising soldering using a flux-cored solder and a soldering iron, wherein the flux-cored solder consists of a flux and a solder alloy containing, in mass %, Fe: 0.02 to 0.1%, Zr: more than 0% and 0.2% or less and Sn: 67.9% or more, the solder alloy has a melting temperature of 350° C. or lower, the flux-cored solder is heated to a temperature range of 240 to 450° C. by the soldering iron, thereby oxidizing Zr in the solder alloy to produce a zirconium oxide, and carbonization of a component of the flux is prevented by a catalytic action of the zirconium oxide and adhesion of a carbide of the flux to an iron tip of the soldering iron is prevented.

BRIEF DESCRIPTION OF THE DRAWING

The FIGURE shows a ternary diagram of a Sn—Fe—Zr solder alloy.

DETAILED DESCRIPTION OF THE INVENTION

The present invention is described in detail below. In this description, "%" with respect to a solder alloy composition is "mass %", unless otherwise specified.
1. Alloy Composition
(1) Fe: 0.02 to 0.1%

Fe is an element effective for reducing elution of Fe into a solder alloy and preventing leaching of a Fe alloy with which an iron tip of a soldering iron is coated. When the Fe content is less than 0.02%, these effects cannot be sufficiently obtained. As the lower limit of the Fe content, it is 0.02% or more, preferably 0.03% or more, and more preferably 0.04% or more. On the other hand, when the Fe content is more than 0.1%, the melting temperature of the solder alloy is excessively increased to require an increase in the set temperature of the soldering iron. This is unfavorable from the viewpoint of the heat-resistant temperature or the like of electronic parts to be subjected to soldering. As the upper limit of the Fe content, it is 0.1% or less, preferably 0.08% or less, and more preferably 0.06% or less.
(2) Zr: More than 0% and 0.2% or Less Zr is an element necessary for preventing the carbonization of rosin present in a flux by a catalytic action based on Zr. The catalytic action based on Zr is assumed to show the following behavior.

Zirconium oxide has both oxidizing properties and reducing properties, and it is therefore considered to show the catalytic action (Tsutomu Yamaguchi, J. Jpn. Petrol. Inst., Vol. 36, No. 4, pp. 250-267 (1993)). Accordingly, it is assumed that zirconium oxide can prevent the carbonization itself of the rosin by oxidation and reduction. In addition to this, even if carbides have been formed, progress of the carbonization is inhibited by a reducing action to the carbides formed. It is therefore assumed that the carbonization of the rosin can be secondarily prevented. In addition, even if the rosin is slightly carbonized, the adhesion of the carbides to the iron tip is rarely found.

Furthermore, there is a report that Zr initiates oxidation at 240 to 290° C. (Hidetsugu Nakamura et al., J. Ind. Exp. Soc.

Jpn., 51(6), P. 383 (1990)). Therefore, in order to obtain the above-mentioned effect, the soldering temperature of 240° C. or higher is considered to be effective.

During soldering by means of the soldering iron, the iron-tip temperature is usually 350 to 450° C. When the solder alloy of the present invention is used in soldering using the soldering iron, most of Zr in the solder alloy is considered to be present as zirconium oxide during soldering. Accordingly, in view of the temperature range in which the catalytic action based on zirconium oxide is exerted, the solder alloy of the present invention is suitably used for soldering using the soldering iron.

When the Zr content is 0%, the effect of preventing the carbonization cannot be obtained. As the lower limit of the Zr content, it is more than 0%, preferably 0.001% or more, and more preferably 0.005% or more. On the other hand, when the Zr content is more than 0.2%, the zirconium compound is abnormally deposited, and therefore, the melting temperature of the solder alloy is excessively increased to require an increase in the set temperature of the soldering iron. This is unfavorable from the viewpoint of the heat-resistant temperature or the like of electronic parts to be subjected to soldering. As the upper limit of the Zr content, it is 0.2% or less, preferably 0.05% or less, and more preferably 0.03% or less. In the solder alloy of the present invention, the effect of preventing the carbonization can be sufficiently obtained even when the Zr content is slight. Therefore, as the upper limit of the Zr content, it is particularly preferably 0.006 or less.

(3) Cu: 0.1 to 4%

Cu is an optional element which can prevent electrode leaching when a material of an electrode is Cu. When the Cu content is 0.1% or more, the above-mentioned effect can be obtained. From this viewpoint, as the lower limits of the Cu content, it is preferably 0.1% or more, more preferably 0.3% or more, and still more preferably 0.5% or more. On the other hand, when the Cu content is 4% or less, the soldering-iron temperature can be set to a temperature range of the soldering working temperature (240 to 450° C.), and thermal damage of the electronic parts to be subjected to soldering can be prevented. Accordingly, as the upper limit of the Cu content, it is preferably 4% or less, more preferably 1.0% or less, and still more preferably 0.7% or less.

(4) At Least One of Sb: 5 to 20%, Ag: 4% or Less, and Bi: 3% or Less

Sb, Ag and Bi are optional elements which can improve wettability of the solder alloy.

Sb can improve temperature cycle properties or fatigue resistance properties, in addition to the above-mentioned effects. In order to obtain such effects, when the solder alloy of the present invention contains Sb, as the lower limit of the Sb content, it is preferably 5% or more, more preferably 6% or more, and still more preferably 7% or more. When the Sb content is 20% or less, it becomes possible to form the solder alloy. When the solder alloy of the present invention contains Sb, as the upper limit of the Sb content, it is preferably 20% or less, more preferably 15% or less, and still more preferably 10% or less.

When Ag is contained in an amount of 0.3% or more, the wettability is significantly improved, and when Ag is contained in an amount of 1% or more, the wettability is further improved. When the solder alloy of the present invention contains Ag, as the lower limit of the Ag content, it is preferably 0.3% or more, and more preferably 1% or more. Furthermore, when the Ag content is 0.3% or more, the melting temperature of the solder alloy is decreased, and therefore, the set temperature of the soldering iron can be decreased, in addition to the above-mentioned effect. In addition to this, the occurrence of the Fe leaching can also be prevented. On the other hand, when the Ag content is 4% or less, crystallization of a coarse compound of SnAg is prevented, and a defect such as a bridge can be prevented when soldering work is performed. When the solder alloy of the present invention contains Ag, as the upper limit of the Ag content, it is preferably 4% or less, and more preferably 3.5% or less.

Bi can improve strength of the solder alloy, and decrease the melting temperature of the solder alloy, in addition to the above-mentioned effect. In order to sufficiently obtain such an effect, when the solder alloy of the present invention contains Bi, as the lower limit of the Bi content, it is preferably 0.06% or more, more preferably 0.3% or more, and still more preferably 0.5% or more. On the other hand, when the Bi content is 3% or less, crystallization of Bi single-phase is prevented and a decrease in falling impact properties can be prevented. When the solder alloy of the present invention contains Bi, as the upper limit of the Bi content, it is preferably 3% or less, more preferably 2% or less, and still more preferably 1% or less.

(5) At Least One of Ni: 0.3% or Less and Co: 0.2% or Less

Ni and Co are optional elements which can prevent the leaching for the Fe alloy.

Ni can improve the fatigue resistance of the solder alloy, in addition to the above-mentioned effect. In order to sufficiently obtain these effects, when the solder alloy of the present invention contains Ni, as the lower limit of the Ni content, it is preferably 0.01% or more. In addition, when the Ni content is 0.3% or less, an increase in the set temperature of the soldering iron due to an increase in the melting temperature of the solder alloy can be prevented, and the occurrence of the Fe leaching can be prevented. When the solder alloy of the present invention contains Ni, as the upper limit of the Ni content, it is preferably 0.3% or less, and more preferably 0.1% or less.

Co promotes the carbonization of the rosin, when Co is added to a Zr-free solder alloy. However, when the solder alloy contains Co together with Zr, the carbonization itself of the rosin based on Zr is prevented, and therefore, while decreasing the adhesion of the carbides, the effect of preventing Fe leaching is also obtained. When the solder alloy of the present invention contains Co, in order to obtain the above-mentioned effect based on Co, as the lower limit of the Co content, it is preferably 0.005% or more. In addition, when the Co content is 0.2% or less, an increase in the melting temperature of the solder alloy can be prevented. When the solder alloy of the present invention contains Co, as the upper limit of the Co content, it is preferably 0.2% or less, and more preferably less than 0.05%.

(6) At Least One of P: 0.1% or Less, Ge: 0.1% or Less, and Ga: 0.1% or Less

P, Ge and Ga are optional elements which can prevent the oxidation of Sn. When the solder alloy of the present invention contains these elements, as the lower limits thereof, these are each preferably 0.001% or more.

In addition, when the contents of P and Ge fall within the above-mentioned range, an increase in the melting temperature of the solder alloy can be prevented. When the solder alloy of the present invention contains these elements, as the upper limits of these contents, these are each preferably 0.01% or less.

Furthermore, when the Ga content is 0.1% or less, a risk of forming a low-melting point phase due to segregation of Ga can be decreased. When the solder alloy of the present invention contains Ga, as the upper limit of the Ga content, it is preferably 0.01% or less.

The balance of the solder alloy in the present invention is Sn. Besides the above-mentioned elements, unavoidable impurities may be contained. Even when the unavoidable impurities are contained, the above-mentioned effects are not affected. In addition, as described later, when element(s) not contained in the present invention is contained as unavoidable impurities, the above-mentioned effects are not affected.

2. Melting Temperature of Solder Alloy

The solder alloy in the present invention desirably has a melting temperature of 350° C. or lower. This is because the iron tip is usually heated at 350 to 450° C. in the case of soldering using a soldering iron.

3. Flux-Cored Solder, Wire Solder, Flux-Cored Wire Solder and Flux-Coated Solder The solder alloy in the present invention is suitably used for a flux-cored solder already having a flux in the solder. In addition, from the viewpoint of feeding the solder to the iron, the solder alloy can also be used in a form of a wire solder. Furthermore, the solder alloy can also be applied to a flux-cored wire solder in which the flux is sealed in the wire solder. Still further, a surface of each solder may be coated with the flux. In addition to this, a surface of the solder having no flux in the solder may be coated with the flux.

The flux content in the solder is, for example, 1 to 10 mass %, and the rosin content in the flux is 70 to 95%. In general, the rosin is an organic compound and contains carbon and oxygen. Therefore, a terminal functional group and the like are not limited in the present invention.

4. Solder Joint

In addition, a "solder joint" in the present invention means a connecting part of an electrode, and the connecting part is formed of the solder alloy in the present invention. In addition, examples of materials of the electrode include Cu, Ni and Al, and the electrode may be an electrode obtained by applying Ni/Au plating to a Cu electrode.

5. Soldering Method

A soldering method using the solder alloy of the present invention is a soldering method of performing soldering using the flux-cored solder and the soldering iron.

The flux-cored solder used in the present invention consists of the above-mentioned flux and the solder alloy.

The flux-cored solder consists of the flux and the solder alloy containing, in mass %, Fe: 0.02 to 0.1%, Zr: more than 0% and 0.2% or less and Sn: 67.9% or more, and the solder alloy preferably has the above-mentioned alloy composition of the solder alloy. The flux components are as described above.

The soldering method of the present invention includes feeding a solder alloy having a predetermined alloy composition to an iron tip set to a predetermined temperature, and heating and melting the solder alloy to solder an electrode or the like. For example, this method is suitable for an automatic soldering apparatus in which soldering is performed a large number of times for a short period of time. In the present invention, of course, the iron-tip temperature of the soldering iron is set to a temperature higher than the melting temperature of the solder alloy. Accordingly, the solder alloy is melted to cause convection of the flux-cored solder, thereby oxidizing Zr to produce sufficient amount of zirconium oxides, and the carbonization can be prevented by the catalytic action thereof. In order to exert the catalytic action of the zirconium oxides obtained by the oxidation of Zr, the iron-tip temperature of the soldering iron is required to be 240 to 450° C., and desirably 350 to 450° C. The heating atmosphere is not particularly restricted, and it is not particularly limited as long as the catalytic action based on the zirconium oxide can be exerted.

As described above, the soldering method of the present invention satisfies the above-mentioned temperature range of the soldering iron, as compared with the usual soldering using the soldering iron, and therefore, the oxidation of Zr can be promoted and the carbonization of the flux components can be prevented.

Examples

The solder alloys shown in Table 1 were prepared. All of these solder alloys were confirmed to have melting temperatures of 350° C. or lower. Using these solder alloys, flux-cored solders were formed, and the Fe leaching and the carbonization were evaluated. The results of evaluation are shown in Table 1.

<Fe Leaching>

Using an automatic soldering apparatus (manufactured by JAPAN UNIX (registered trade mark) CO., LTD., UNIX (registered trade mark)-413S), soldering was performed in the atmosphere at an iron-tip temperature of 380° C., a solder feeding speed of 10 mm/sec and a solder feeding amount of 15 mm per shot, and the Fe leaching of an iron tip was evaluated, while subjecting the iron tip to air cleaning once every 10 shots. An iron used is P2D-R (model number) manufactured by JAPAN UNIX (registered trade mark) CO., LTD., and Fe plating having a film thickness of 500 μm is applied to a surface of Cu which is a core of the iron. In addition, as the flux-cored solder, one having a flux content of 3 mass % in the solder and a rosin content of 90% in the flux was used.

In an evaluation method of the Fe leaching, a state where a hole was formed in the Fe plating of the iron tip at the time of 25,000 shots to expose Cu as the core material was evaluated as "x", and a state where no hole was formed was evaluated as "○".

<Carbonization>

Using the automatic soldering apparatus (manufactured by JAPAN UNIX (registered trade mark) CO., LTD., UNIX (registered trade mark)-413S), soldering was performed at an iron-tip temperature of 380° C., a solder feeding speed of 10 mm/sec and a solder feeding amount of 15 mm per shot, and the carbonization of the iron tip was evaluated, while subjecting the iron tip to air cleaning once every 10 shots. The flux-cored solder used was one used in the evaluation of the Fe Leaching.

In an evaluation method of the carbonization, a state where carbides adhered to a Fe-plated part of the iron tip at the time of 10,000 shots was evaluated as "x", and a state where no carbides adhered was evaluated as "○". When the carbides adhere to the Fe-plated part of the iron tip, the contact area with the solder is decreased to deteriorate solderability.

In Table 1, the case where the evaluation could not be performed in the evaluation of the Fe leaching and the carbonization is represented by "-".

TABLE 1

| | Alloy composition (mass %) | | | | | | | | | | | | Fe leaching | Carbonization |
|---|---|---|---|---|---|---|---|---|---|---|---|---|---|---|
| | Sn | Fe | Zr | Cu | Sb | Ag | Bi | Ni | Co | P | Ge | Ga | | |
| Example 1 | Balance | 0.02 | 0.020 | | | | | | | | | | ○ | ○ |
| Example 2 | Balance | 0.10 | 0.020 | | | | | | | | | | ○ | ○ |
| Example 3 | Balance | 0.04 | 0.001 | | | | | | | | | | ○ | ○ |
| Example 4 | Balance | 0.04 | 0.020 | | | | | | | | | | ○ | ○ |
| Example 5 | Balance | 0.04 | 0.200 | | | | | | | | | | ○ | ○ |
| Example 6 | Balance | 0.02 | 0.020 | 0.5 | | 3 | | | | | | | ○ | ○ |
| Example 7 | Balance | 0.10 | 0.020 | 0.5 | | 3 | | | | | | | ○ | ○ |
| Example 8 | Balance | 0.04 | 0.001 | 0.5 | | 3 | | | | | | | ○ | ○ |
| Example 9 | Balance | 0.04 | 0.006 | 0.5 | | 3 | | | | | | | ○ | ○ |
| Example 10 | Balance | 0.04 | 0.020 | 0.5 | | 3 | | | | | | | ○ | ○ |
| Example 11 | Balance | 0.04 | 0.200 | 0.5 | | 3 | | | | | | | ○ | ○ |
| Example 12 | Balance | 0.04 | 0.020 | 0.1 | | 3 | | | | | | | ○ | ○ |
| Example 13 | Balance | 0.04 | 0.020 | 4 | | 3 | | | | | | | ○ | ○ |
| Example 14 | Balance | 0.04 | 0.020 | 0.5 | | — | | | | | | | ○ | ○ |
| Example 15 | Balance | 0.04 | 0.020 | | 5 | | | | | | | | ○ | ○ |
| Example 16 | Balance | 0.04 | 0.020 | | 10 | | | | | | | | ○ | ○ |
| Example 17 | Balance | 0.04 | 0.020 | 0.5 | 10 | | | | | | | | ○ | ○ |
| Example 18 | Balance | 0.04 | 0.020 | 0.5 | 10 | 3 | | | | | | | ○ | ○ |
| Example 19 | Balance | 0.02 | 0.020 | | 10 | | | | | | | | ○ | ○ |
| Example 20 | Balance | 0.10 | 0.020 | | 10 | | | | | | | | ○ | ○ |
| Example 21 | Balance | 0.04 | 0.020 | | | 3 | | | | | | | ○ | ○ |
| Example 22 | Balance | 0.04 | 0.020 | 0.5 | | 0.08 | | | | | | | ○ | ○ |
| Example 23 | Balance | 0.04 | 0.020 | 0.5 | | — | 0.1 | | | | | | ○ | ○ |
| Example 24 | Balance | 0.04 | 0.020 | 0.5 | | 3 | 3 | | | | | | ○ | ○ |
| Example 25 | Balance | 0.04 | 0.020 | 0.5 | | 3 | 0.06 | | | | | | ○ | ○ |
| Example 26 | Balance | 0.04 | 0.020 | 0.5 | | 3 | | 0.3 | | | | | ○ | ○ |
| Example 27 | Balance | 0.04 | 0.020 | 0.5 | | 3 | | 0.01 | | | | | ○ | ○ |
| Example 28 | Balance | 0.04 | 0.020 | 0.5 | | 3 | | | 0.2 | | | | ○ | ○ |
| Example 29 | Balance | 0.04 | 0.020 | 0.5 | | 3 | | | 0.005 | | | | ○ | ○ |
| Example 30 | Balance | 0.04 | 0.020 | 0.5 | | 3 | | | | 0.1 | | | ○ | ○ |
| Example 31 | Balance | 0.04 | 0.020 | 0.5 | | 3 | | | | 0.01 | | | ○ | ○ |
| Example 32 | Balance | 0.04 | 0.020 | 0.5 | | 3 | | | | | 0.1 | | ○ | ○ |
| Example 33 | Balance | 0.04 | 0.020 | 0.5 | | 3 | | | | | 0.01 | | ○ | ○ |
| Example 34 | Balance | 0.04 | 0.020 | 0.5 | | 3 | | | | | | 0.1 | ○ | ○ |
| Example 35 | Balance | 0.04 | 0.020 | 0.5 | | 3 | | | | | | 0.01 | ○ | ○ |
| Example 36 | Balance | 0.04 | 0.020 | 0.5 | | 3 | 3 | 0.3 | 0.2 | 0.1 | 0.1 | 0.1 | ○ | ○ |
| Example 37 | Balance | 0.04 | 0.020 | 0.5 | 10 | 3 | 3 | 0.3 | 0.2 | 0.1 | 0.1 | 0.1 | ○ | ○ |
| Comparative Example 1 | Balance | 0.01 | 0.020 | | | | | | | | | | X | ○ |
| Comparative Example 2 | Balance | 0.15 | 0.020 | | | | | | | | | | — | — |
| Comparative Example 3 | Balance | 0.04 | | | | | | | | | | | ○ | X |
| Comparative Example 4 | Balance | 0.04 | 0.300 | | | | | | | | | | — | — |
| Comparative Example 5 | Balance | | | 0.5 | | 3 | | | | | | | X | ○ |
| Comparative Example 6 | Balance | 0.01 | 0.020 | 0.5 | | 3 | | | | | | | X | ○ |
| Comparative Example 7 | Balance | 0.15 | 0.020 | 0.5 | | 3 | | | | | | | — | — |
| Comparative Example 8 | Balance | 0.04 | | 0.5 | | 3 | | | | | | | ○ | X |
| Comparative Example 9 | Balance | 0.04 | 0.300 | 0.5 | | 3 | | | | | | | — | — |
| Comparative Example 10 | Balance | | | 0.5 | | 3 | | | 0.005 | | | | ○ | X |

As is shown in Table 1, in all of Examples 1 to 37, the evaluation of the Fe leaching was "○", and the evaluation of the carbonization was also "○".

On the other hand, in Comparative Examples 1 and 6 in which the Fe content was small, at the time of 25,000 shots, the Fe leaching occurred and Cu which was the core of the iron was exposed. In addition, in Comparative Example 5 in which Fe was not contained, the Fe leaching occurred at the time of 10,000 shots, and therefore, the carbonization was not evaluated.

In Comparative Examples 2 and 7 in which the Fe content was large, the melting temperature of each solder alloy was excessively increased to require an increase in the set temperature of the iron tip. This is unfavorable from the viewpoint of the heat-resistant temperature of electronic parts. Accordingly, such solder alloys did not have minimum performance as the flux-cored solder, and therefore, the Fe leaching and the carbonization were not evaluated.

In Comparative Examples 3 and 8 in which Zr was not contained, the Fe content was suitable, and therefore, the Fe leaching did not occur. However, the carbonization could not be prevented because Zr was not contained.

In Comparative Examples 4 and 9 in which the Zr content was large, the Zr compound was abnormally deposited, and therefore, the melting temperature of the solder alloy was excessively increased to require an increase in the set temperature of the iron tip. For the same reason as described above, the Fe leaching and the carbonization were not evaluated.

In Comparative Example 10 in which Fe and Zr were not contained and Co was contained, the adhesion of the carbides was observed, although the problem of the Fe leaching could be solved. In Comparative Example 10 in which Co was contained in the Sn—Ag—Cu solder alloy, a larger amount of the carbides were adhered than the case of Comparative Example 8 in which Fe was contained in the Sn—Ag—Cu solder alloy.

In addition, the Sn—Fe—Zr-based solder alloy of the present invention is described in detail using a ternary diagram thereof. The FIGURE shows the ternary diagram of the Sn—Fe—Zr solder alloy. In the FIGURE, the base is the Sn content (mass %), the left side is the Zr content (mass %), the right side is the Fe content (mass %), "○" indicates Examples 1 to 5, "x" indicates Comparative Examples 1 to 4, and the mesh area indicates the composition area of the present invention. As is apparent from the FIGURE, it is found that all the alloy compositions in which Fe and Zr fall within the ranges of the present invention can prevent the Fe leaching and the carbonization. In particular, in Example 3 in which the Zr content is 0.001%, it has become clear that the sufficient effect of preventing the carbonization could be obtained. On the other hand, the alloy compositions outside the range of the present invention did not satisfy both of them at the same time. This is the same also for the alloy composition containing optional element(s) in the present invention.

The invention claimed is:

1. A solder alloy for preventing Fe leaching, in which adhesion of a carbide to an iron tip is controlled, the solder alloy consisting of, in mass %:
   Fe in an amount of 0.02 to 0.1%;
   Zr in an amount of 0.001% or more to 0.2% or less;
   Cu in an amount of 4% or less;
   at least one of Sb in an amount of 20% or less, Ag in an amount of 4% or less and Bi in an amount of 3% or less;
   at least one of Ni in an amount of 0.3% or less and Co in an amount of 0.2% or less;
   at least one of P in an amount of 0.1% or less, Ge in an amount of 0.1% or less and Ga in an amount of 0.1% or less; and
   a balance being Sn.

2. The solder alloy according to claim 1, wherein the amount of Cu is 0.1 to 4%.

3. The solder alloy according to claim 1, wherein the amount of Sb is 5 to 20%.

4. A flux-cored solder comprising the solder alloy according to claim 1.

5. A flux-coated solder comprising:
   the flux-cored solder according to claim 4; and
   a flux, wherein
   a surface of the flux-cored solder is coated with the flux.

6. A wire solder comprising the solder alloy according to claim 1.

7. A flux-coated solder comprising:
   the wire solder according to claim 6; and
   a flux, wherein
   a surface of the wire solder is coated with the flux.

8. A flux-cored wire solder comprising the solder alloy according to claim 1.

9. A flux-coated solder comprising:
   the flux-cored wire solder according to claim 8; and
   a flux, wherein
   a surface of the flux-cored wire solder is coated with the flux.

10. A solder joint comprising the solder alloy according to claim 1.

* * * * *